United States Patent [19]

Matsuo et al.

[11] 3,937,915
[45] Feb. 10, 1976

[54] METAL WORKING METHOD USING ELECTRIC ARC AND JET GAS AND THE APPARATUS THEREFOR

[75] Inventors: Koziro Matsuo, Yamatokoriyama; Kozi Ishihara, Hirakata; Masonori Maeda, Kadoma, all of Japan

[73] Assignee: Matsushita Electric Industrial Co., Ltd., Osaka, Japan

[22] Filed: Dec. 18, 1973

[21] Appl. No.: 425,802

[30] Foreign Application Priority Data
Dec. 19, 1972 Japan.............................. 47-127865
Feb. 13, 1973 Japan.............................. 48-18075
May 17, 1973 Japan......................... 48-58629[U]

[52] U.S. Cl................................... 219/68; 219/72
[51] Int. Cl.² ......................................... B23P 1/00
[58] Field of Search ............ 219/72, 70, 74, 137, 68

[56] References Cited
UNITED STATES PATENTS

| | | | |
|---|---|---|---|
| 1,775,532 | 9/1930 | Le Boeuf | 219/72 X |
| 1,958,649 | 5/1934 | Stine | 219/137 |
| 2,008,846 | 7/1935 | Zack | 219/72 X |
| 2,028,780 | 1/1936 | Ito | 219/72 X |
| 2,726,309 | 12/1955 | Stepath | 219/70 |
| 2,862,099 | 11/1958 | Gage | 219/74 |
| 3,100,255 | 8/1963 | Miller | 219/70 |
| R21,897 | 9/1941 | Taylor | 219/74 X |

*Primary Examiner*—J. V. Truhe
*Assistant Examiner*—N. D. Herkamp
*Attorney, Agent, or Firm*—Stevens, Davis, Miller & Mosher

[57] ABSTRACT

The method and apparatus in accordance with the present invention achieve the same working effect as grooving, drilling, cutting, and the like on a metal work by blowing off, with the use of a non-combustible jet gas, the molten metal heated and made molten by an electric arc. The atmosphere at the operating location where the electric arc and the jet gas are provided, is formed by a fluid atmosphere produced by the discharge of a non-combustible liquid. As a result, matters and substance such as dust particles, carbon monoxide, and the like existing around the operating location and serving to deteriorate the operating environment, are adsorbed and taken up by the fluid atmosphere for decreasing the amount of such matters and substance which are released to the operating environment surrounding the fluid atmosphere.

16 Claims, 13 Drawing Figures

METAL WORKING METHOD USING ELECTRIC ARC AND JET GAS AND THE APPARATUS THEREFOR

SUMMARY OF INVENTION

The present invention relates to a metal working method and the apparatus therefor in which the same working effect as grooving, drilling, cutting, finishing, and the like is achieved on a metal work by flowing off, with the use of a non-combustible jet gas such as an air jet, the molten metal heated and made molten by an electric arc, and more particularly to a metal working method and the apparatus therefor, designed for carrying out so-called gouging and blasting operations, in which an electric arc is generated between an electrode bar and a metal work piece, a portion of the metal work piece is heated and made molten by said electric arc, a non-combustible compressed gas such as compressed air is, simultaneously with said heating and melting operation of said electric arc, discharged toward the metal work, preferably along the electrode bar, to form a jet of gas, and the heated molten metal is blown off by said jet of gas to scrape off a portion of the metal work so that the same working effect as grooving, drilling, cutting, finishing, and the like can be achieved on the metal work.

In a conventional metal working method of this kind, there are used a supporting means such as a torch for supporting an electrode bar made of a material consisting mainly of carbon suitably spaced from a metal work, a power source means for generating an electric arc between the electrode bar and the metal work piece by applying a voltage through the supporting means across the electrode bar and the metal work piece, and a compressed air supply means for discharging compressed air through the supporting means along the electrode bar. The electric arc is generated between the electrode bar and the metal work piece, and the metal molten by the heat of the arc is blown off for removal by the jet of air discharged along the electrode bar. Thus, the same working effect as grooving, drilling, cutting, and the like can be achieved on the metal work. At this time, due to the heat of the arc, the electrode bar made of a material consisting mainly of carbon undergoes oxidation wear, i.e., so-called combustion, and its length is decreased gradually. This conventional method is commonly called the "arc air method". The arc air method is widely used since, in comparison with the other metal working methods such as the gas flame method, chipping method, and the like, this method can be performed in the production shop relatively easily with a high operational efficiency. However, the arc air method has the following disadvantages:

1. Metal fume, mist, iron oxides, and the like blown off by the jet of air are released to the operating environment. The dust particles around the operating location are blown up into the air by the jet of air. Moreover, when the electrode bar made of a material consisting mainly of carbon is subjected to oxidation wear due to the heat of the arc, the electrode portion slightly apart from the complete combustion electrode portion (the end portion) where the arc is generated, undergoes incomplete combustion to produce carbon monoxide which is then released to the operating environment. Further, impurities such as a water proofing agent, plating agent, and the like which penetrated into the carbon electrode bar when the bar was manufactured, will burn with smoke and a strong smell will hang over in the operating environment. The operating environment is deteriorated giving a bad influence on the health of operators since the iron oxide particles, the dust particles other than the iron oxide particles, the carbon monoxide, the smoke, and the like are released to the operating environment.

2. Temperature of the apparatus is increased due to heat in the electric current path through which a large current flows for generating electric arc, and to high radiation heat caused by the electric arc. In order to overcome this temperature rise, it has been necessary to construct a large-sized heavy-weight unit for obtaining an increased amount of spontaneous heat radiation. Particularly in the type of the apparatus in which the electrode bar is supported in a torch and the operation is carried out manually, the operator feels the torch heavy and the radiation heat of the arc hot, which naturally imparis the ease of the operation. Still more, the manufactuing cost of the apparatus is increased on account of the large size of the unit.

3. The electrode bar wears rapidly since no provision is made for limiting the oxidation wear of the electrode bar. Because of this, an increased number of the electrode bars is needed to perform a given amount of operation, resulting in a very uneconomical feature of the apparatus.

One object of the present invention is to provide a metal working method using an electric arc and gas jet and the apparatus therefor in which matters and substance which deteriorate the operating environment such as dust particles, carbon monoxide, smoke, odor, and the like, are released to the operating environment in very small amounts, enabling maintainance of a sanitary operating environment and eliminating the possibility of giving a bad influence on the health of operators.

Another object of the present invention is to provide a metal working method using an electric arc and jet gas and the apparatus therefor in which influences on the apparatus of the heat in the currrent path and the heat of the arc can be decreased. The current path, torch, and the like which heretofore have been subjected to the strong influence of heat can be constructed compact and light weight, and an apparatus is obtained which is handy to carry and easy to operate.

A further object of the present invention is to provide a metal working method using an electric arc and gas jet and the apparatus therefor in which the oxidation wear speed of the electrode bar can be reduced, the number of electrode bars needed to perform a given amount of operation can be decreased, and an economical operation can be attained.

A still further object of the present invention is to provide a metal working method using an electric arc and jet gas and the apparatus therefor in which said objects can be accomplished very efficiently by a simple process or means.

The present invention is a metal working method comprising the steps of generating an electric arc between an electrode bar and a metal work piece, heating and melting a portion of the metal work by said electric arc, discharging, simultaneously with said heating and melting operation of said electric arc, a non-combustible compressed gas to the heated and molten portion of the metal work to form a jet of gas, blowing off the molten metal by said jet of gas, and achieving the same effect as grooving, drilling, cutting, and the like on the metal work piece, and characterized in that a non-combustible liquid is discharged toward the metal work to form a fluid atmosphere, and the atmosphere at the operating location where said electric arc and said jet of gas are provided, is formed by said fluid atmosphere.

In embodying the present invention, there are used a supporting means for supporting an electrode bar suitably spaced from a metal work, a power source means for generating an electric arc by applying a voltage across the electrode bar and the metal work, a gas supply means for discharging a non-combustible compressed gas to a heated and molten portion of the metal work to form a jet gas and for blowing off the molten metal by said jet gas, and a liquid supply means for discharging a non-combustible liquid toward the metal work to form a fluid atmosphere.

The electric arc must have a magnitude sufficient to melt the metal work rapidly. When performing so-called blasting operations such as deburring of castings, removing of defective portions, finishing, and the like, the magnitude of the electric arc should be about 1,400–1,500 amp. As the compressed gas, non-combustible gases of, for example, nitrogen and carbon dioxide may be used. However, compressed air is the most suitable in view of the influence on operators, the influence on the composition of metal work, cost, and other factors. Thus, in the following explanations, the compressed gas is compressed air. The compressed air must have a pressure and flow amount which are large enough to blow off and remove the molten metal. At least, a pressure of 4 $kg/cm^2$ or more and a flow amount of 300 $l/min$ or more are necessary. For instance, if the metal work is iron, a pressure of 5–7 $kg/cm^2$ and a flow amount of 300–700 $l/min$ are required. As for the liquid to surround the electric arc and the jet of gas, any non-combustible liquid suffices. But from the viewpoints such as influence on the operators, heat stability, cooling performance, cost, and the like, water is most suitable for this purpose. Therefore, in the explanations below, water is used as the liquid for surrounding the electric arc and the jet of gas. In the following will be explained the methods for surrounding the operating location where the electric arc and the jet gas are provided with a fluid atmosphere of water. One method is to mix water in compressed air to be discharged as a jet spray so that the electric arc is placed in the jet spray. In the other method, water is discharged together with air other than the jet air to form a jet spray which surrounds the electric arc and the jet of air. Then, compressed air is discharged to the outer periphery of the discharged jet air to form a cylindrical water curtain inside which the electric arc and the jet air are placed. The former method is considered to be suitable for the purpose in the present invention on the grounds that it can be practiced very conveniently and that it can attain a required end with a small amount of water used, avoiding flooding at the operating location which is often the case when a large amount of water is used. Additional excellent effects can be obtained by including in the water such additives as a frother for accelerating the adsorption of dust particles and other foreign matters, an antirust agent for preventing rusting of the metal work due to the water, and the like. When employing the former method, the water should be sprayed with a flow amount of 50 cc/min or more, preferably 100–500 cc/min.

Thus, in a preferred embodiment of the present invention, compressed air and water are respectively used as the non-combustible compressed gas and the non-combustible liquid, and the compressed air and the water are mixed and discharged along the electrode bar to form a jet spray in which the electric arc is placed. In this case, a compressed air supply means is used as the compressed gas supply means and a water supply means as the liquid supply means. The jet spray can be readily produced, based on the principle of spraying, by mixing the water in the compressed air in a stage prior to the discharge of the compressed air, and discharging the mixture of the water and the compressed air.

With respect to the supporting means, power source means, and air supply means, basically speaking, the conventional products or their improvements may be used. In accordance with the present invention, a water supply means is employed which is lacking in the apparatus of the conventional arc air method. This water supply means can be formed by a means feeding the city water directly to the passage of the compressed air. However, since a high pressure of more than 4 $kg/cm^2$ is applied to the compressed air passage, it is better to construct the apparatus such that the water fed to the passage is placed under the same pressure as the compressed air. To attain this purpose, an enclosed liquid tank is connected through a liquid passage to the compressed air passage, and to the upper part of the liquid tank is connected a compressing passage separated from said compressed air passage at a point upstream of the connecting point of the liquid tank. With this arrangement, a portion of the compressed air can be supplied to the liquid tank for equalizing the inner pressure of the liquid tank with the inner pressure of the compressed air passage.

Further, in accordance with the present invention, a torch is used as the supporting means, and there may also be employed a manually operated means in which the operator holds the torch in his hand and moves the torch and the electrode bar together to carry out the working, and an automatic means for automatically moving the electrode bar.

The above and other objects and the novel features of the present invention will become clear by the following description of a preferred embodiment taking reference with the attached drawings, in which.

Figure 11:
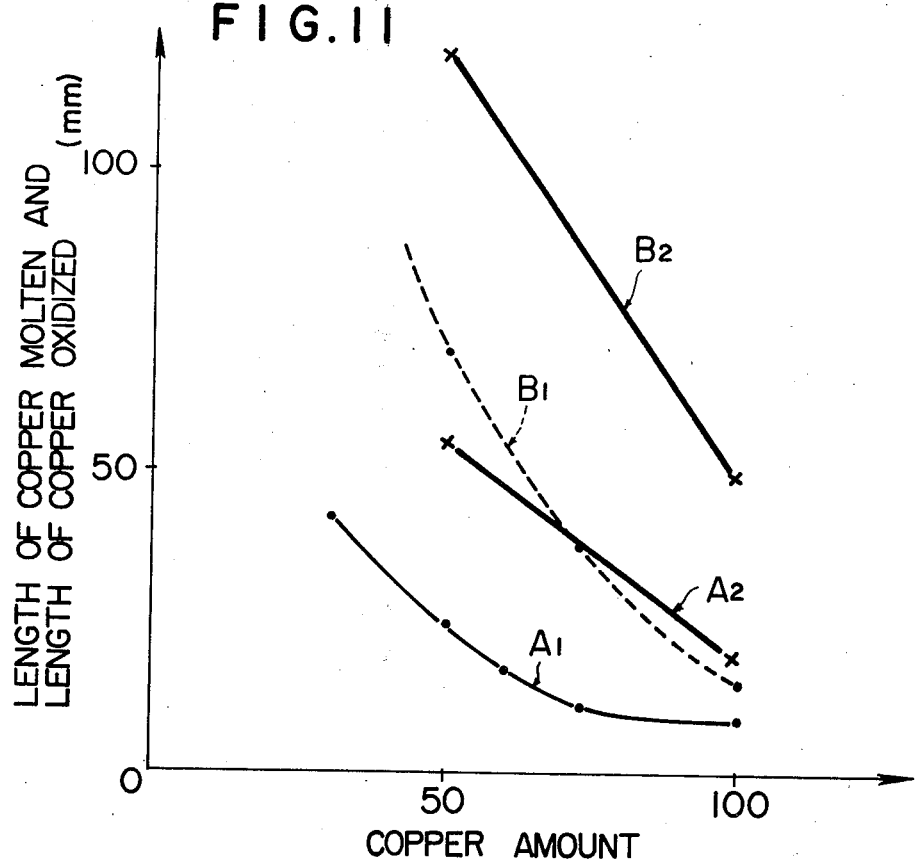
Figure 12:
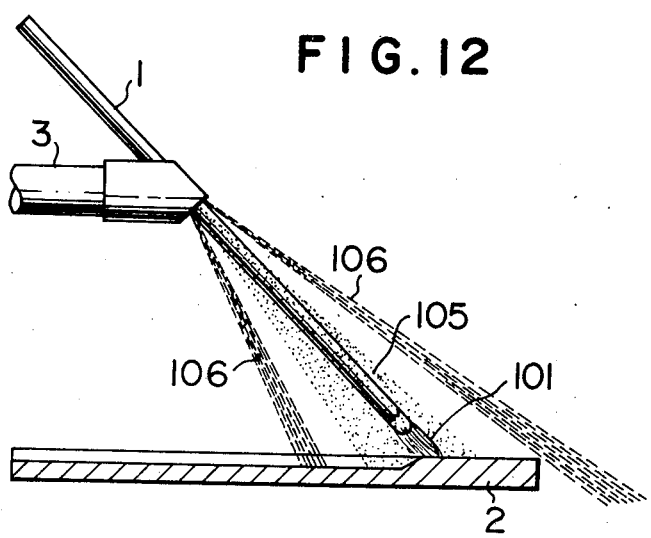

FIG. 11 is a diagram showing the interrelationships among the amount of copper used in a copper coating of a carbon electrode bar, length of the copper coating molten on operation, and length of the electrode bar oxidized, which were observed respectively using the method of the present invention and the conventional method; and FIG. 12 is a view illustrating an operating location of another embodiment of the present invention.

Figure 13:
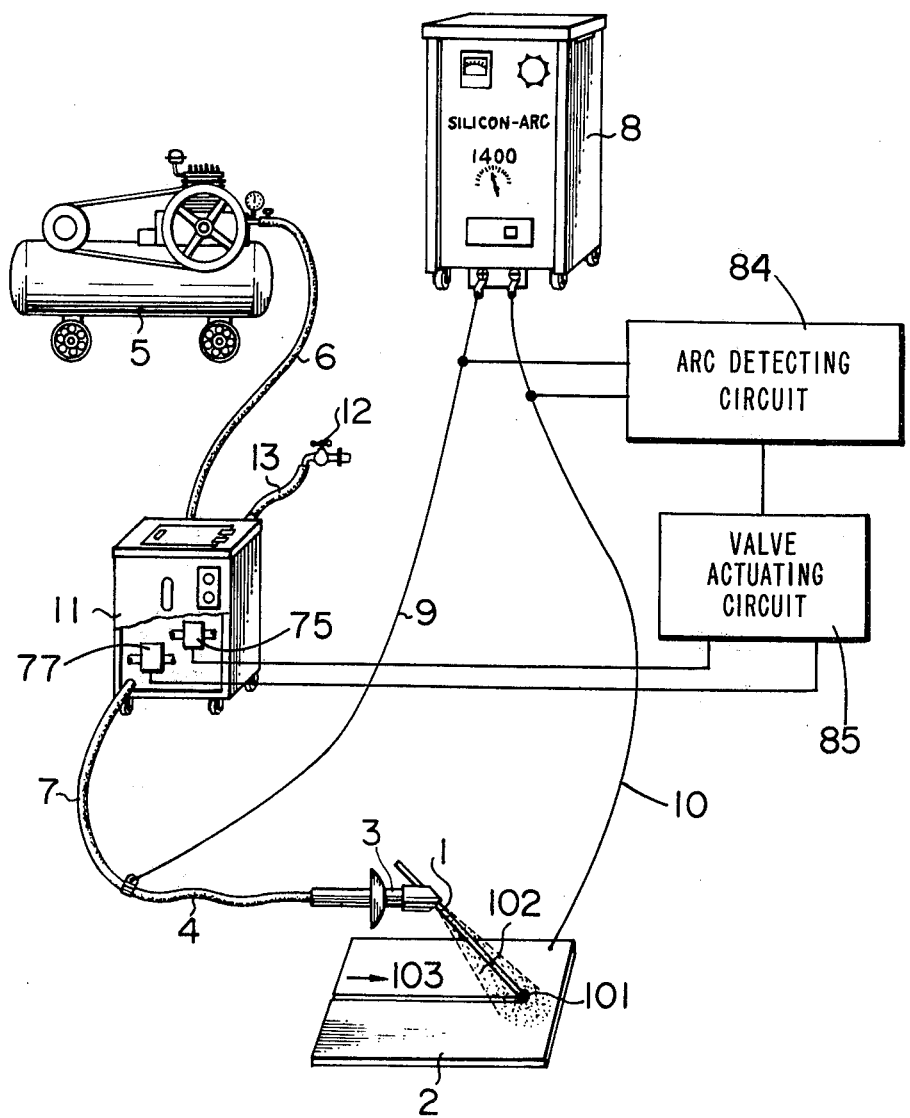

FIG. 13 is a perspective view of an alternative embodiment of a metal working apparatus using an electric arc and gas jet which is employed in the present invention.

DETAILED DESCRIPTION OF INVENTION

Figure 1:
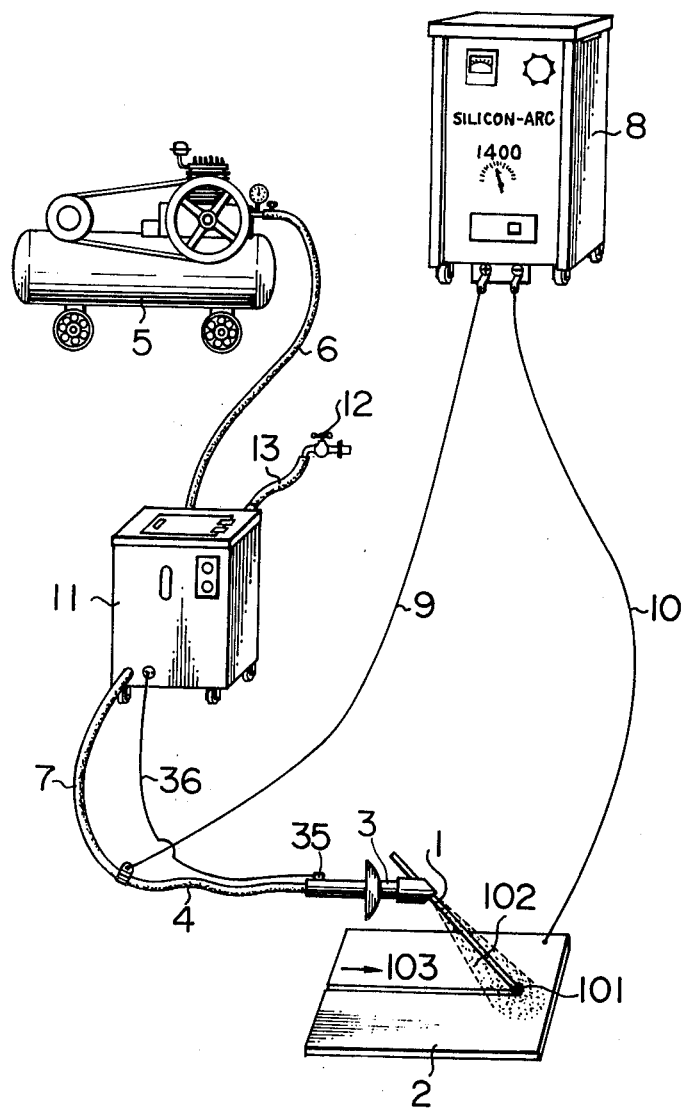
FIG. 1 is a perspective view of a metal working apparatus using an electric arc and gas jet which is employed in the embodiment of the present invention.

In the first place, referring to FIGS. 1 and 2, an explanation will be made on the entire construction of the apparatus in accordance with the present invention. In the figures, the numeral 1 indicates a carbon electrode bar for generating an electric arc, which was manufactured by coating the backed surface of the carbon bar with an electroconductive metal film, for example, a plated copper film. The numeral 2 designates a metal work piece made of iron or other metal. The numeral 3 indicates a torch detachably supporting the electrode bar 1 and having a fluid passage for supplying the mixture of compressed air and water to jet holes at the end of the torch and a current path for flowing an electric current to the electrode bar 1. The numeral 4 designates a cable detachably and rotatably connected to the rear end of the torch 3, which has a fluid passage in communication with the fluid passage in the torch 3 and a current path in communication with said current path. The numeral 5 indicates a compressor operating as a compressed air supply means, which is connected to the rear end of the cable 4 through hoses 6 and 7. Said compressor supplies to the torch 3 through hoses 6 and 7 and the cable 4 compressed air under a pressure of 5–7 kg/cm² with a flow rate of 300 cc/min or more. Numeral 8 designates a direct current power source means which has its positive lead 9 connected to the rear end of the cable 4 and its negative lead 10 connected to the metal work piece 2. When the end of the electrode bar 1 is brought close to the metal work 2, an electric arc 101 of about 1,300–1,600 amp is generated therebetween. The numeral 11 indicates a water supply means connected between the hoses 6 and 7, by which the water coming from a tap 12 through a hose 13 is introduced at a flow rate of 100–700 cc/min into the compressed air from the hose 6. Thus, the mixture of compressed air and water is supplied to the hose 7, the cable 4, and the torch 3.

Figure 3:
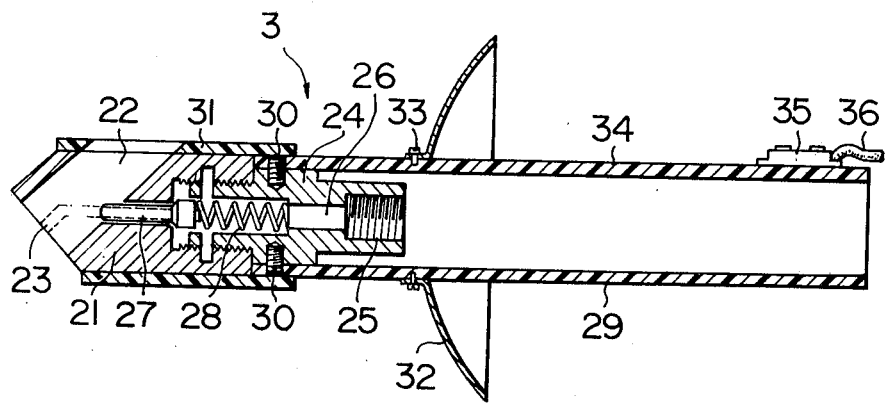
FIG. 3 is a longitudinal sectional view of a torch.
Figure 4:
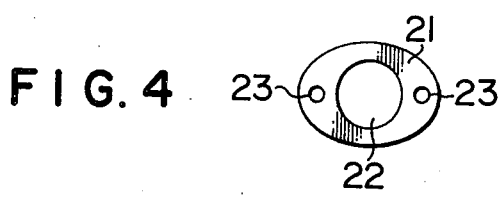
FIG. 4 is a partial front view of a head of the torch.

A detailed explanation will be given here on the torch 3 referring to FIGS. 3 and 4. In the figures, the numeral 21 designates a head made of copper, which has a supporting hole 22 through which the electrode bar 1 extends jet holes 23 provided on both sides of the supporting hole 22. Through these two jet holes 23 the mixture of compressed air and water is discharged along the electrode bar 1 to form jet sprays 102. Each of the jet sprays 102 discharged from the two jet holes 23 spreads conically and begins to come one upon another at a point just behind the electric arc 101 in relation to the proceeding direction of operation 103. The numeral 24 indicates a cylindrical connecting fitting screwed in the head 21. The fitting 24 is made of a metal having a high electric conductivity and has at the rear end thereof a connection 25 for screwing in the cable 4. Inside the fitting 24 is formed a fluid passage 26 communicating with said jet holes 23. An electric current path is constituted by the connecting fitting 24 and the head 21. The numeral 27 designates a pressing bar projecting from the side wall of the supporting hole 22 to press and lock the electrode bar 1. The pressing bar 27 is slidably tensioned by a coil spring 28 provided in the fluid passage 26 to project into the supporting hole 22. The numeral 29 indicates a cylindrical shank connected to the connecting fitting 24 by screws 30, and the numeral 31 designates an outer cover on the outer surface of the head 21. The shank 29 and the outer cover 31 are constructed of an electrically insulating material having a heat resisting property and accommodate the head 21 and the connecting fitting 24. The numeral 32 indicates a generally dome-shaped collar fixed to the shank 29 at a location relatively close to the front end of the shank 29 by means of screws 33. The portion of the shank 29 rearward of the collar 32 constitutes a handle 34, and when the opeator grips the handle 34, the collar 32 serves as a protection for the operator's hand. The numeral 35 designates a manual switch arranged on the outer surface of the rear end of the handle 34, which controls the supply of the mixture of compressed air and water. The manual switch 35 is connected through a lead 36 to electromagnetic valves, which will be described later, in the water supply means 11.

Figure 5:
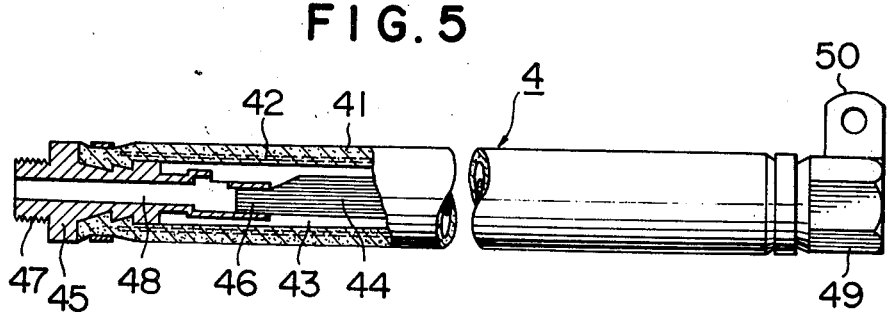
FIG. 5 is a longitudinal sectional view illustrating in plan a portion of a cable.
Figure 6:
FIG. 6 is a cross sectional view of FIG. 5.

Turning to FIGS. 5 and 6, the cable 4 will be explained in detail. In the figures, the numeral 41 indicates a hose made of neoprene rubber in which are mixed knitting yarns 42 for the purpose of thermal resistance. The inner hollow portion of the hose 41 is used as a fluid passage 43. The numeral 44 designates an electrical wire arranged in the fluid passage 43. The electrical wire 44 consists of copper strands and its outer diameter is smaller than the diameter of the passage 43. The numeral 45 indicates a connecting fitting for connecting the cable 4 to the connection 25 of the torch 3. The connecting fitting 45 has one end thereof electrically connected at 46 to the electrical wire 44 and the other end thereof formed as a connection 47 to be screwed to the connection 25 of the torch 3. In the connecting fitting 45 is formed a fluid passage 48 which connects the fluid passage 43 of the cable 4 to the fluid passage 26 of the torch 3. The numeral 49 designates a connecting fitting for connecting the cable 4 to the hose 7, which has the same construction as that of said fitting 45. The connecting fitting 49 is electrically connected to the electrical wire 44 and has therein a fluid passage for connecting the hose 7 to the fluid passage 43. On the outer surface of the fitting 49 is provided a connecting piece 50 to which is connected the lead 9 from the power source means 8.

Figure 7:
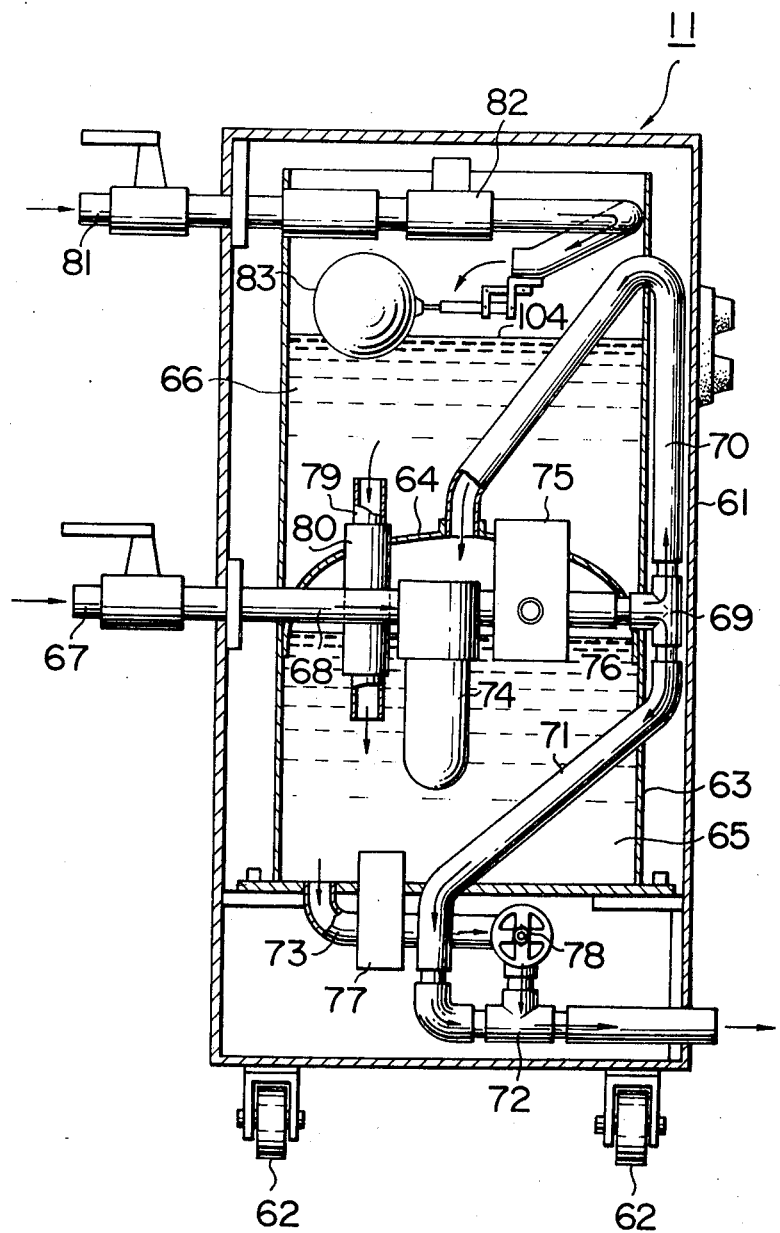
FIG. 7 is a longitudinal sectional view, as seen from a side, of a water supply means.
Figure 8:
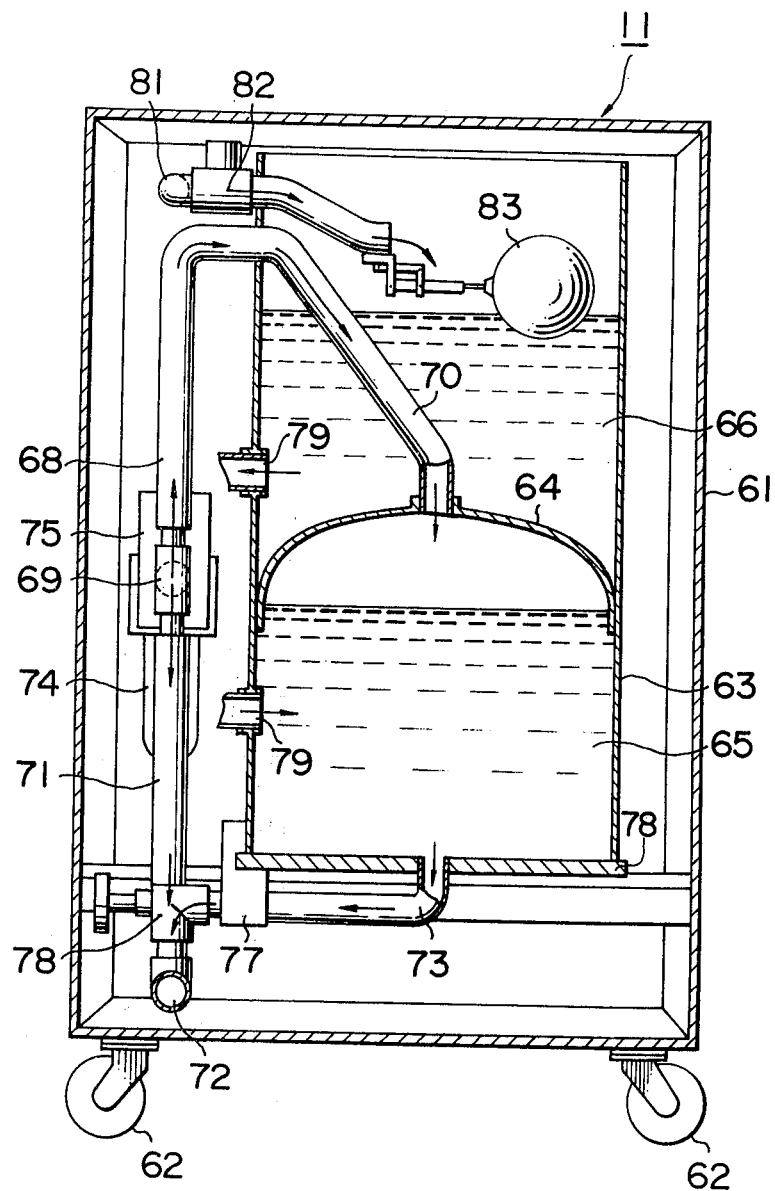
FIG. 8 is a longitudinal sectional view, as seen from the front side, of said water supply means.
Figure 9:
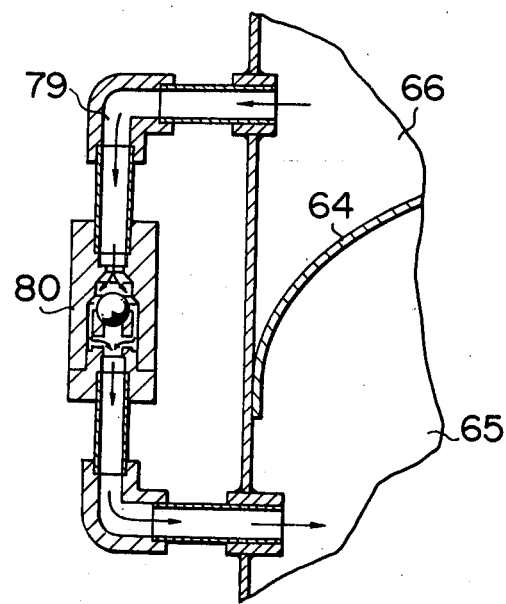
FIG. 9 is an enlarged sectional view of an important part of said water supply means.

Referring to FIGS. 7 through 9, a detailed explanation will be made of the water supply means 11. In the figures, the numeral 61 indicates a metal case of the water supply means, the bottom surface of which has at four corners thereof freely-movable wheels 62 for the movement of the whole means. The numeral 63 designates a tank disposed in the case 61. The tank 63 is made of such material as metal and is of very stout construction. The tank 63 is divided by a dome-shaped partition plate 64 into two parts, an upwardly-opening upper part forming a supply tank 66 and a lower part constituting a liquid tank 65 in the form of an enclosed container. The numeral 67 indicates a fluid passage through which flows the compressed air coming from the compressor 5 through the hose 6. The fluid passage 67 enters the case 61 at the central part of one side of the case 61 and extends through an upstream portion 68 to a substantially T-shaped branching point 69 where a compressing passage 70 is separated. A midstream portion 71 turns downwardly to extend through a downstream portion 72 reaching the lower part of the opposite side of the case 61 where the fluid passage 67 leaves the case 61 to be connected to the hose 7. The compressing passage 70 extends upwardly along a side of the supply tank 66 and enters the supply tank 66 at a point higher than a water level 104 in the supply tank 66. The end of the compressing passage 70 is connected to the central part of the dome-shaped partition plate 64 and opens into the liquid tank 65. The numeral 73 designates a liquid passage extending from the bottom of the liquid tank 65. The liquid passage 73 is arranged in a manner utilizing gravity and is connected to the downstream portion 72 of the fluid passage 67, which is placed at a location lower than the liquid passage 73. In the upstream portion 68 which is to windward of the branching point 69 are disposed a filter 74 for removing dust particles and the like from the compressed air coming from the compressor 5 and a three-way electromagnetic valve 75 for air for controlling the supply of the compressed air to the torch 3. The three-way valve 75 is provided with an air port 76 opening to the external air in addition to two ports connected to the upstream portion 68 and the midstream portion 71 of the passage 67. The three-way valve 75 is so constructed that when the upstream portion 68 communicates with the midstream portion 71, the air port 76 is closed, and when the communication between the upstream portion 68 and the midstream portion 71 is terminated, the air port 76 communicates with the midstream portion 71. Hereinafter in the explanation of this three-way valve 75, the state in which the upstream portion 68 and the midstream portion 71 are in communication with each other is called "open," and the state in which there is no communication between the upstream portion 68 and the midstream portion 71 is called "closed." By making the compressing passage 70 thicker or shorter than the passage 71 after the branching point 69, the fluid resistance in the passage portion from the valve 75 through the compressing passage 70 to the liquid tank 65 is rendered lower than the fluid resistance in the passage portion from the valve 75 through the fluid passages 71, 72, 43, 48, and 26 to the jet holes 23 of the torch 3. In the liquid passage 73 is arranged an electromagnetic switching valve 77 for water to control the downward flow of water and a controlling valve 78 such as a needle valve to control as desired the amount of water flowing downwardly. Said electromagnetic valves 75 and 77 operate in an interlocking manner in response to the manipulation of the manual switch 35 of the troch 3. The numeral 79 indicates a supply passage starting from the bottom of the supply tank 66 and reaching the liquid tank 65. A check valve 80 is provided in the supply passage 79. The check valve 80 is closed during the working operation at which time a high pressure is applied in the liquid tank 65, so that the downward flow of water from the supply tank 66 is stopped. When the working operation is terminated and the pressure in the liquid tank 65 is reduced to a level near the atmospheric pressure, the check valve 80 is opened so that the water in the supply tank 66 flows through the supply passage 79 down to the liquid tank 65. As the check valve 80, there may be used a unidirectional check valve which prevents only the escape of high pressure from the liquid tank 65 to the supply tank 66 or a bidirectional check valve which prevents also the downward flowing of water from the supply tank 66 to the liquid tank 65 when the water level in the liquid tank 65 rises to the location of the check valve 80 during the water supplying operation. When using the unidirectional check valve, it is necessary to place the uppermost portion of the compressing passage 70 extending upwardly at a point higher than the water level 104 in the supply tank 66. On the other hand, if a bidirectional check valve is employed, the uppermost portion of the compressing passage 70 must be placed at a point higher than the location of the check valve 80. By so doing, the water in the liquid tank 65 is prevented from flowing into the midstream portion of the passage 67 through the compressing passage 70 due to the siphon principle. The numeral 81 designates a water supply passage which feeds the water from the tap 12 to the supply tank 66. The water supply passage 81 enters the case 61 at the upper part of the side of the case 61 to be connected to the supply tank 66. The water supply passage 81 is provided with an electromagnetic switching valve 82 for controlling the water level. The switching valve 82 opens and closes in an interlocking manner with a float 83 on the water surface in the supply tank 66. The switching valve 82 forms a so-called cistern system which opens only when the float 83 is placed at a level lower than the predetermined water level to maintain the water level 104 in the supply tank 66 constant.

Detailed explanations are omitted for the compressor 5, the direct current power source means 8, and the hoses 6 and 7 since they are publicly known types which are employed in the present invention.

When operating the metal working apparatus with a construction described above, the compressor 5 is actuated first, and the switch 35 of the torch 3 is manipulated to open the electromagnetic valves 75 and 77. The controlling valve 78 is also opened in a suitable manner, and the power source 8 is turned on. The compressed air from the compressor 5 passes through the hose 6 to reach the water supply means 11 and goes through the upstream portion 68 of the fluid passage 67, the filter 74, the valve 75 to the branching point 69 where the compressed air takes two separate ways. One flow of the compressed air passes through the compressing passage 70 to enter the liquid tank 66 for equalizing the pressure in the liquid tank 66 with the atmospheric pressure in the fluid passage 67. The other flow of the compressed air goes to the midstream portion 71 and the downstream portion 72. Owing to gravity and the negative pressure in the lower part of the liquid passage 73 caused by the compressed air flowing through the fluid passage 67, the water in the liquid tank 65 flows down through the liquid passage 73 to be mixed in the compressed air flowing through the downstream portion on common passage 72 of the fluid passage 67. The compressed air and water thus mixed together pass through the hose 7, the fluid passages 43 and 48 of the cable 4, and the fluid passage 26 of the torch 3 to be discharged from the jet holes 23 in the end of the torch 3. According to the principle of spraying, the water is sprayed along the carbon electrode bar 1. The jet sprays 102 produced in this way are a mixture of jet air formed by the discharge of the compressed air and water particles produced by the water discharged with the compressed air. Under these conditions, the end of the carbon electrode bar 1 is brought in the vicinity of the metal work piece 2 to generate the electric arc 101. In this stage of operation, the electric circuit comprises the positive terminal of the power source means 8, the lead 9, the current paths 50, 49, 44, and 45 of the cable 4, the current paths 24 and 21 of the torch 3, the carbon electrode bar 1, the electric arc 101, the metal work 2, the lead 10, and the negative terminal of the power source means 8. The metal molten by the electric arc 101 is blown off by the jet air in the jet sprays 102 discharged along the carbon electrode bar 1. At the same time, the torch 3 is moved manually or automatically in both lateral and longitudinal directions for achieving the same working effect as grooving, drilling, cutting, and the like.

After the conclusion of the operation, the carbon electrode bar 1 is withdrawn from the metal work 2 to terminate the generation of the electric arc 101. Then, the switch 35 of the torch 3 is operated to close the electromagnetic valves 75 and 77 for stopping the mixed discharge of compressed air and water. At this time, the air port 76 of the three-way electromagnetic valve 75 is opened, and the high pressure air in the liquid tank 65 escapes to the outside of the apparatus through the compressing passage 70, the branching point 69, and the air port 76 so that the pressure in the liquid tank 65 is equalized with the atmospheric pressure. As a result, the check valve 80 in the supply passage 79 is opened, and the water in the supply tank 66 flows down through the supply passage 79 until the liquid tank 65 is completely filled with the water. When the water level 104 in the supply tank 66 has been lowered to the predetermined point, the switching valve for water 82 opens sensing the vertical movement of the water level 104 by the vertical movement of the float 83 so that the city water is introduced into the supply tank 66. As soon as the water level in the supply tank 66 rises to the predetermined point, the switching valve for water 82 is closed to terminate the supply of water. As will be understood from the above description on the operation of the apparatus, there is a possibility that the water in the liquid tank 65 will be completely exhausted if the operation is continued for a very long period of time. However, the complete exhaustion of the liquid tank 65 and the stoppage of the water spray discharge scarcely take place because in this type of operation it is a common practice to complete a series of working steps in several minutes or to temporarily discontinue the operation after the lapse of several minutes. Since the flow amount of the water is about 100 – 700 cc/min, the liquid tank 65 will not become excessively large even if its size is selected to hold a volume of water sufficient to carry out the operation continuously for several hours.

When the apparatus is operated as described above, the carbon electrode bar 1 gradually undergoes oxidation wear due to the heat of the arc and is shortened from the tip. Complete combustion takes place in the end portion of the carbon electrode bar 1 where the electric arc 101 is generated, but only incomplete combustion takes place in the electrode portion slightly apart from the end portion, where a temperature of 400° – 1,000°C prevails. On account of this incomplete combustion, carbon monoxide gas is produced. Moreover, smoke and a strong smell result from the burning of the impurities contained in the carbon electrode bar 1. Furthermore, metal fume, mist, and dust particles including iron oxide particles are blown up into the air when the molten metal is blown off by the jet air. However, in the present invention, the electrode bar 1 and the electric arc 101 are covered by the jet sprays 102 formed by the jet air and the water discharged together, so that the dust particles, smoke, strong smell, and the like produced at the operating location are adsorbed by the water particles in said jet sprays 102 and projected against the metal work surface, the ground, and the like, reducing the amount of said dust particles and the like which are released to the outside of the jet sprays 102. In particular, the amount of the dust particles blown up into the air is greatly decreased. As the jet sprays 102 also have an action to cool the carbon electrode bar 1, the temperature gradient of the carbon electrode bar 1 becomes steep, reducing the range of incomplete combustion. Therefore, carbon monoxide produced by the carbon electrode bar 1 itself is decreased in amount. On account of this reduced amount of the carbon monoxide and the fact that a portion of the produced carbon monoxide is absorbed by the jet sprays 102 for removal, the carbon monoxide released to the operating environment surrounding the jet sprays 102 is very small in amount in comparison with the conventional methods. Thus, a very small amount of the matter and substance such as the dust particles, the carbon monoxide, and the like, which deteriorate the operating environment, is released to the outside of the jet sprays 102, so that a sanitary operating environment can be maintained eliminating harmful influence on the health of operators.

The metal working method in accordance with the present invention A and a aconventional metal working method B were compared with each other in terms of the amount of dust particles produced. The measured values are given in Table 1. The measurements were performed under the conditions $\alpha$ and $\beta$. In the measurement under the condition $\alpha$, blasting operation was carried out continuously for 5 minutes in a sealed room having a volume of 5.8 m³. In the measurement under the condition $\beta$, blasting operation was performed continuously for 20 minutes in a room of 75 m³ volume, one side of which was open for an area of 2 m². In the two measurements, the blasting conditions were the same. There was used regular mild steel SS-41 for the metal work, and the carbon electrode bar used had a diameter of 19 mm and a length of 355 mm. An electric current of 1,400 – 1,500 amp and an air pressure of 6 – 7 kg/cm² were employed. A water spray amount of 200 cc/min was used when the method of the present invention A was tested. The measuring instrument was a sampler manufactured by Staplex Co. of West Germany. The air inlet of the measuring instrument was placed near the operator's mouth to take in the room air. Weight measurements were conducted on the dust particules taken in the instrument together with the room air. In comparing the dust particle weights of the method of the present invention A and the conventional method B, the dust particle weight of the conventional method B was taken as the reference value 100.

Table 1

| Amount of dust particles | Item | Method of the present invention A | Conventional method B |
|---|---|---|---|
| Condition $\alpha$ | | 65 | 100 |
| Condition $\beta$ | | 41 | 100 |

Then, the metal working method in accordance with the present invention A and the conventional metal working method B were compared with each other in terms of the amount of carbon monoxide produced and the amount of carbon dioxide produced. The measured values are given in Table 2. The measurements were carried out under said conditions α and β using infrared ray absorption method. In comparing the amounts of gases produced in the method of the present invention A and the conventional method B, the amount of gas produced in the conventional method B was taken as the reference value 100.

Table 2

| Measurement item | Item | Method of the present invention A | Conventional method B |
| --- | --- | --- | --- |
| CO | Condition α | 64 | 100 |
|  | Condition β | 51 | 100 |
| CO$_2$ | Condition α | 75 | 100 |

As can be clearly seen from the results shown in Tables 1 and 2, if the metal working method and the apparatus therefor both in accordance with the present invention are employed, the matter and substance such as the dust particles, the carbon monoxide, and the like, which deteriorate the operating environment, are absorbed by the jet sprays 102 for removal, or their production is restricted, so that the amount of such matters and substances which are released to the outside of the jet sprays 102 is greatly decreased. In consequence, a sanitary operating environment can be maintained eliminating harmful influence on the health of operators.

The metal working method in accordance with the present invention A and the conventional metal working method B were compared with each other in terms of the changes in temperature and humidity of the operating environment with the progress of working operation. The measured values are shown in Table 3. In the test, a blasting operation was performed continuously for 5 minutes in a sealed room having a volume of 5.8 m³. The temperature and humidity were measured respectively by a thermometer and magnetic hair hygrometer. The blasting conditions used were a metal work of regular mild steel SS-41, a carbon electrode bar of 19 mm in diameter by 355 mm long, an electric current of 1,400 – 1,500 amp, and an air pressure of 6 – 7 kg/cm². In the method of the present invention A, there was used a water spray amount of 180 cc/min.

Table 3

| Measurement item | Item | Method of the present invention A | Conventional method B |
| --- | --- | --- | --- |
| Temperature [°C] | Before operation | 26 | 26 |
|  | Maximum during operation | 46 | 66 |
| Humidity [%] | Before operation | 60 | 60 |
|  | Maximum during operation | 65 | 39 |

Since the blasting operation was carried out in a small sealed room, the measured values given above show that there were large differences between the temperature and humidity measured before the operation and those measured during the operation, and also a large difference between the two methods in terms of the temperature and humidity. However, these differences will be much smaller in actual practice because blasting operations are generally performed in a large room or outdoors. From the measurement results described above, it is clear that the method of the present invention A is superior to the conventional method B in that the former does not increase the room temperature much. In the conventional method B, the room humidity decreases during the operation. In contrast, if the method of the present invention A is employed, the room humidity increases slightly during the operation. The metal working method in accordance with the present invention has a restrictive action on humidity decrease which takes place with the progress of this type of operation and can maintain the humidity in the optimum range.

In the apparatus in accordance with the present invention, the cable 4 and the torch 3 are cooled by the water blowing through them. Thanks to this feature, the torch 3 and the cable 4, which heretofore have been manufactured in large diameters to avoid adverse effects of the heat generated in them, can be manufactured in small diameters, resulting in easier operation of the torch 3. By manufacturing the torch 3 and the cable 4 in smaller diameters, the material cost for them is reduced, naturally leading to a considerable decrease in the overall production cost.

The metal working method in accordance with the present invention A and the conventional method B were compared with each other in terms of the temperature rise during the operation of the torch 3 and the cable 4. The measured values are shown in Table 4 and FIG. 10. The measurements were conducted under the condition γ in which a cable 4 having an electrical wire 44 with a cross section of 80 mm² (permissible current 1,600 amp) was used, and under the condition λ in which a cable 4 having an electrical wire 44 with a cross section of 38 mm² (permissible current 700 amp) was used. The blasting operation was performed using a metal work 2 made of regular mild steel SS-41, a carbon electrode bar 1 of 19 mm in diameter by 355 mm long, an operating current of 1,400 – 1,500 amp, and an air pressure of 5 – 6 kg/cm². In the method of the present invention A, there were used a water spray amount of 150 cc/min and a water temperature of 24°C. The temperature was measured by an automatic temperature recorder provided with a copper-constantan thermocouple. Table 4 shows the temperatures at various locations of the apparatus which were measured when, after the start of the operation, heat generation and heat release reached an equilibrium, resulting in the stoppage of temperature rise.

Table 4

| Measured location and their temperatures [°C] | Item | Method of the present invention A | | Conventional method B | |
| --- | --- | --- | --- | --- | --- |
| | | Condition γ | Condition λ | Condition γ | Condition λ |
| Head 21 of torch 3 | | 25 | 28 | 170 | 205 |
| Torch 3 | | 59 | 57 | 207 | 210 |
| Handle 34 of torch 3 | | 20 | 25 | 130 | melted |
| Connecting fitting of cable 4 | | — | 59 | — | melted |
| Hose 41 of cable 4 | | 30 | 38 | 120 | punctured |

Figure 10:
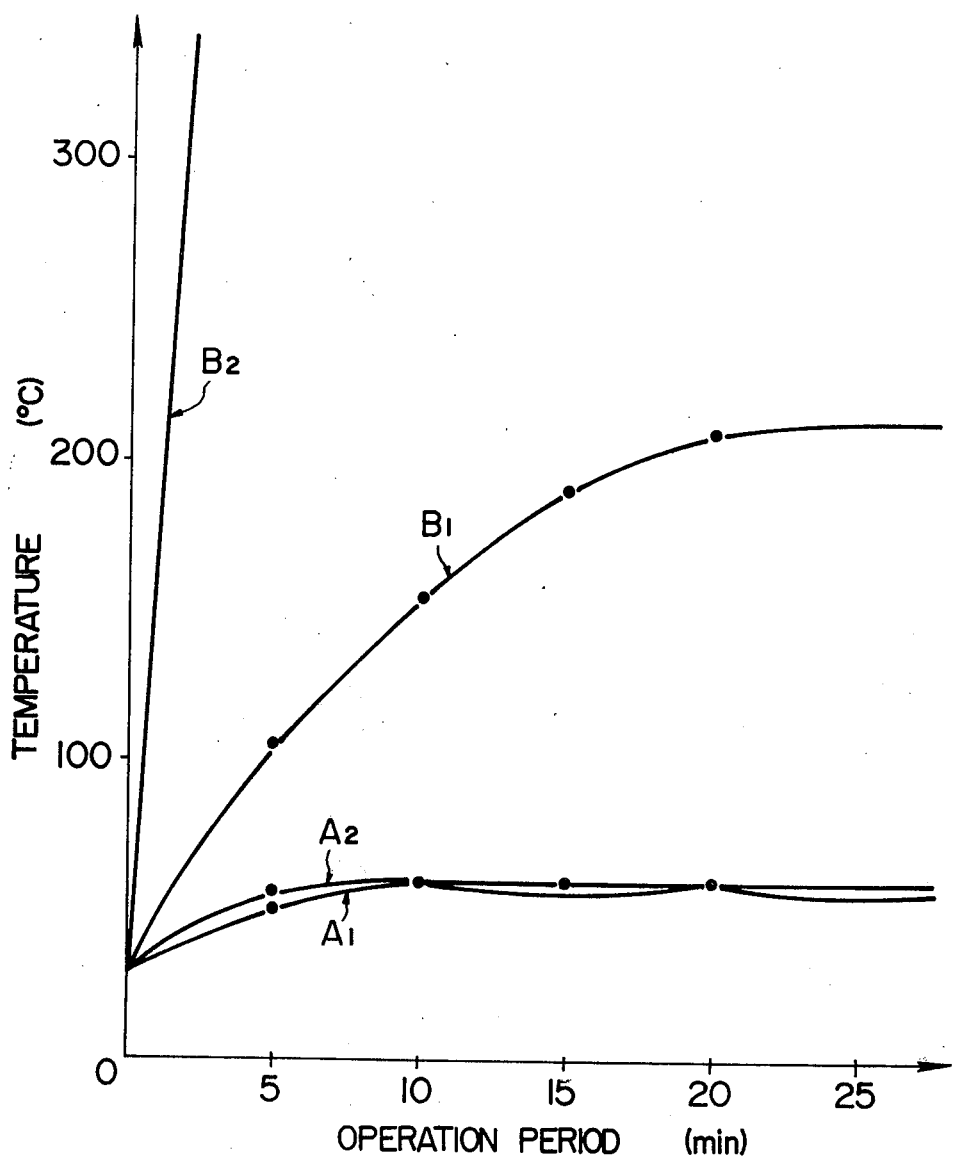
FIG. 10 is a diagram showing the temperature rise, with the lapse of time beginning at the start of the operation, at the connection of a torch and cable, which were measured respectively using the method of the present invention and a conventional method.

FIG. 10 shows the temperature rises at the connection between the torch 3 and the cable 4, which changed during the operation with the progress thereof. In the diagram, the symbols $A_1$, $A_2$, $B_1$, and $B_2$ indicate respectively the property of the method of the present invention under the condition γ, the property of the method of the present invention under the condition λ, the property of the conventional method under the condition γ, and the property of the conventional method under the condition λ.

In the method of the present invention A, under both the conditions γ and λ, heat equilibrium was attained about 20 minutes after the start of operation, and no temperature rise was observed even though the operation was continued thereafter, which enabled the temperatures at various locations of the apparatus to be kept below 60°C. In contrast to this, in the conventional method B under the condition γ, heat equilibrium was attained about 12 minutes after the start of operation, and the temperatures at the handle 34 of the torch 3 and the hose 41 of the cable 4 rose high to 120° – 130°C. And in the conventional method B under the condition λ, at about 2 minutes after the start of operation, the electrical wire 44 of the cable 4 and the hose 41 melted with the simultaneous burning of the handle 29 of the torch 3, forcing the operation of the apparatus to a halt.

As is apparent from those test results, in accordance with the present invention, the torch 3 and the cable 4 can be prevented from undergoing an excessive temperature rise and also can be manufactured compact and light weight with small sizes and diameters.

Further in accordance with the present invention, as described previously, since the jet sprays 102 have the action to cool the carbon electrode bar 1, the temperature gradient of the electrode bar 1 becomes steep so that the length of melting range of copper film on the outer surface of the carbon electrode bar 1 is decreased. On account of this, the wear speed of the carbon electrode bar 1 is reduced, and the number of the electrode bars 1 needed to carry out a given amount of operation is decreased to attain a very economical feature of the present invention.

The metal working method in accordance with the present invention A and the conventional metal working method B were compared with each other in terms of the wear rate of the carbon electrode bar 1 and the operational efficiency. The measured values are given in Table 5. The blasting operation was performed using a metal work piece 2 of regular mild steel SS-41, a carbon electrode bar 1 of 19 mm in diameter by 355 mm long, an operating current of 1,400 – 1,500 amp, and an air pressure of 5 – 6 kg/cm². When the method of the present invention was tested, a water spray amount of 150 cc/min was employed. The wear rate of the carbon electrode bar 1 and the operational efficiency were obtained by the following formulas:

$$\text{Wear rate} = \frac{\text{Amount of steel removed}}{\text{Length of carbon electrode bar worn}} [g/cm]$$

$$\text{Operational efficiency} = \frac{\text{Amount of steel removed}}{\text{Operation period}} [g/min]$$

Table 5

| Measurement item | Item | Method of the present invention A | Conventional method B |
| --- | --- | --- | --- |
| Wear rate of carbon electrode bar [g/cm] | Mean value | 20.6 | 19.1 |
| | Maximum value | 21.6 | 19.5 |
| | Minimum value | 19.0 | 18.7 |
| Operational efficiency [g/min] | | 1140 | 1100 |

As can be readily seen from the test results shown in Table 5 above, in accordance with the method of the present invention, although the operational efficiency is not improved to a high degree in comparison with the conventional method, the wear rate of a carbon electrode bar is improved by about 10 % compared with the conventional method, resulting in a greater economy of the method of the present invention.

In operation, due to the heat of the electric arc 101 generated at the end of the carbon electrode bar 1, the copper film on the surface of electrode portion close to the electric arc 101 melts to expose the inner portion of the carbon bar. However, in the present invention, the melting range of the copper film can be reduced because the jet sprays 102 cool the carbon electrode bar 1. The electric arc 101 becomes unstable and difficulty accompanies the operation if the length of copper film that is molten, measured from the electrode end, exceeds about 15 mm. In order to limit the melting range of the copper film to less than about 15 mm in operation, heretofore there has been relied on a method to increase the thickness of the copper film, resulting in an increased consumption of copper. With the employment of the present invention, the copper film can be made thinner to reduce copper consumption thanks to the cooling action of the jet sprays 102.

The interrelationship among the total amount of copper used for the carbon electrode bar 1, length of melting range of the copper film, and length of oxidizing range of the electrode bar was examined. The test results are given in FIG. 11. FIG. 11 shows changes in melting range of the copper film and oxidizing range of the electrode bar 1 according to a change in copper amount used in the electrode bar, which were tested and measured using the conventional arc air method and the method of the present invention. In FIG. 11, the copper amount reference value 100 is the copper amount at the time when the melting range of copper film reached a point 15 mm from the electrode end by using the conventional arc air method. In the diagram, the symbols $A_1$, $A_2$, $B_1$, and $B_2$ indicate respectively a property curve showing the length of copper molten in the method of the present invention, a property curve showing the length of the electrode portion oxidized in the method of the present invention, a property curve showing the length of molten copper in the conventional method, and a property curve showing the length of the electrode portion oxidized in the conventional method.

It is apparent from FIG. 11 that, in order to keep the length of the copper film on the electrode bar 1 that melts below 15 mm, whereas the conventional method requires a copper amount of 100, the method in accordance with the present invention needs a copper amount of only 60, reducing the copper amount required by 40 %.

Better results can be obtained by adding an improving agent for accelerating the actions and effects described above to the water used in the present invention. As such an improving agent, there may be used a cleanser for increasing the water's ability to absorb dust particles and the like, a frother such as a mixture of sodium bicarbonate and aluminum sulfate, a reducing solution in which are dissolved manganese dioxide and cuprous chloride that have a reducing action, an antirust agent for preventing the spray water from rusting the metal work, a coloring agent for improving the property of the water to shield the arc, and a perfume for overcoming bad smells, and the like. A test was conducted to observe and measure the production of carbonic acid gas, carbon monoxide, copper fume, odor, and smoke and the wear speed of the electrode bar, using the method $A_1$ in which the water was discharged together with the air jet, the method $A_2$ in which said water had added thereto a cleanser, the method $A_3$ in which said water had added thereto a dilute acid solution by manganese dioxide, the method $A_4$ in which said water had added thereto a water solution of cuprous chloride and hydrochloric acid, and the method B in which an air jet alone was used as has been customary heretofore. In the test, a gouging operation was performed for 5 minutes in a sealed room having a volume of 5.8 m³. The test results are shown in Table 6. The test conditions used were a metal work 2 of regular mild steel SS-41, an electrode bar 1 of 8 mm in diameter by 355 mm long, an operating current of 1,200 – 1,400 amp, an air pressure of 5 – 6 kg/cm², and an air flow amount of 600 $l$/min. When testing the method of the present invention, a water spray amount of 200 cc/min was employed.

Table 6

| Measurement item | Method | A1 | A2 | A3 | A4 | B |
|---|---|---|---|---|---|---|
| Dust particles (iron oxide) (mg/m³) | | 105 | 75 | 98 | 120 | 651 |
| Carbonic acid gas (%) | | 0.09 | 0.09 | 0.07 | 0.08 | 0.12 |
| Carbon monoxide (ppm) | | 410 | 540 | 120 | 280 | 1,000 |
| Copper fume (mg/m³) | | 0.28 | 0.21 | 0.41 | 0.24 | 0.72 |
| Odor | | weak | weak | weak | acidic odor | strong |
| Smoke | | little | little | little | steam produced | full of the room |
| Wear speed of electrode bar (cm/min) | | 6.4 | 6.2 | 6.0 | 6.8 | 7.5 |

As can be understood from the test results given in Table 6, more excellent actions and effects are attained by adding a variety of improving agents to the water used in the metal working method in accordance with the present invention.

In the water supply means 11 of the present invention, the compressed air from the compressor 5 is fed through the upstream portion 68 of the fluid passage 67, the branching point 69, the compressing passage 70 to the liquid tank 65 for equalizing the pressure in the liquid tank 65 with the pressure in the fluid passage 67, so that the water in the liquid tank 65 flows down spontaneously by gravity into the liquid passage 73. Thus, the water can be mixed in the compressed air in a very sure manner using a simple construction without relying on a driving source. Thanks to this construction, the water supply means 11 can be manufactured at a low production cost and operated with a minimum rate of trouble. Moreover, the water spray amount per unit time is very stable giving no adverse effect on the operation.

Since the supply of compressed air and the supply of water are controlled separately and independently by the valves 75 and 77, there is no possibility that during the downtime the water and air remain in a mixed state in the fluid passages 71, 72, 43, 48, 26, and 23 which are located downstream of the valves 75 and 77. Consequently, rusting never takes place in the metal portions of the torch 3 and the cable 4. Further, as the water and the compressed air controlled to required flow amounts are mixed just before the start of operation to be discharged with the start of the operation, a required water spray amount per unit time can be obtained as soon as the operation commences without any delay or waiting time. This permits an instantaneous start of the operation.

Still further, thanks to the manual switch 35 for controlling the supply of compressed air and water which is located within easy reach of the operator, the operator can perform the controlling of the supply of compressed air and water in a very handy manner without changing his working posture. In the conventional arc air method, the supply of compressed air is controlled by manipulating an air valve provided in the torch. If this conventional torch is used in the apparatus of the present invention, the air valve in the torch controls the supply of a mixture of compressed air and water, and the water may come out the air valve during the downtime, providing undesirable possibilities of leakage and electric shock. In contrast, in accordance with the present invention, the supply of compressed air and the supply of water are controlled separately by the valves 75 and 77, and the valves 75 and 77 are opened and closed by the manipulation of the manual switch 35 of the torch 3 without any possibility of water leakage in the torch and the like during the downtime. Thus, a safe operation is assured, the fear of leakage or electric shock being completely eliminated.

With the opening and closing of the valves 75 and 77, the pressure in the liquid tank 65 is increased and decreased between the levels equivalent to the atmospheric pressure and to the pressure of compressed air. The liquid tank 65 has connected thereto the supply tank 66 provided at a higher location than the liquid tank 65, and between the liquid tank 65 and the supply tank 66 is disposed the check valve 80 which closes when the liquid tank 65 has therein a high pressure and opens when the liquid tank 65 has therein the atmospheric pressure. In the supply tank 66 is arranged an automatic water supply means, for example, a cistern system, for maintaining the water level 104 in the tank 66 within a required range, so that, when the operation is terminated with the valves 75 and 77 closed, the liquid tank 65 has therein the atmospheric pressure and the water in the supply tank 66 flows spontaneously down to the liquid tank 65 to be ready for the next operation. Thus, there is no need to supply water especially to the liquid tank 65, the operation of the apparatus being rendered very simple and easy.

The fluid resistance in the passage portion from the valve 75 of the fluid passage 67 through the compressing passage 70 to the liquid tank 65, is made equivalent to or smaller than the fluid resistance in the passage portion from said valve 75 through the fluid passages 71, 72, 43, 48, and 26 to the endmost jet holes 23. And the valve 75 in the fluid passage 67 and the valve 77 in the liquid passage 73 open and close simultaneously in an interlocking manner. As a result, the instant when the valves 75 and 77 are opened, the compressed air from the compressor 5 first enters the liquid tank 65 through the compressing passage 70 to increase the pressure in the liquid tank 65 to a level equivalent to the pressure of the compressed air, and then flows to the fluid passages 71, 72, 43, 48, and 26 after the pressure in the liquid tank 65 has increased to a required level. Thus, the supplying operation of water begins as soon as the valves 75 and 77 are opened, so that the water spray is discharged simultaneously with the discharge of compressed air. There is no time lag between the discharge of compressed air and the discharge of water, resulting in a very easy and trouble-free instantaneous start of operation.

Figure 2:
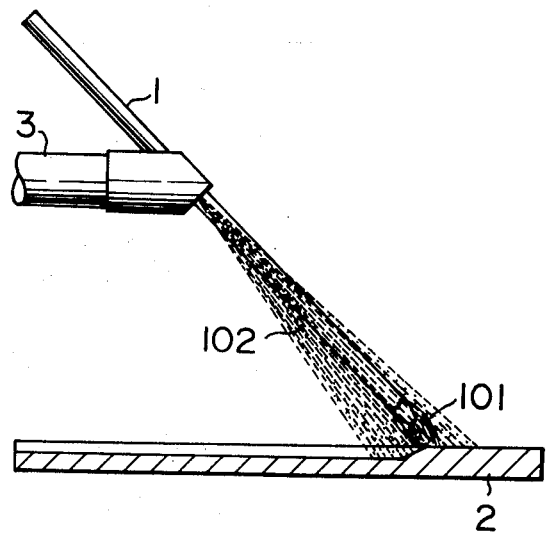
FIG. 2 is a view showing an operating location of said embodiment.

In the embodiment of the present invention described in the foregoing, as shown in FIG. 2, water and compressed air are mixed together and then discharged to form the jet sprays 102 which surround the electric arc 101. However, as shown in FIG. 12, the compressed air and the water may be discharged separately from separate locations to form an air jet 105 and a cylindrical water curtain 106 so that the cylindrical water curtain 106 surrounds the electric arc 101 and the air jet 105 which are necessary for performing the metal working. Further, the compressed air may be divided into two streams, and the main one of the two streams may be discharged independently to form the air jet 105 while the other one of the two flows may be discharged together with the water to form the cylindrical water curtain 106 which surrounds the electric arc 101 and the air jet 105 indispensable for the metal working. With the generation of the electric arc 101 and the progress of operation, the voltage across the terminals of the power source means 8 changes greatly. As shown in FIG. 13, if this change of the voltage is detected by a detecting means, such as arc detecting circuit 84, a valve operating means including a relay or the like, such as valve activating circuit 85, opens or closes the electromagnetic valves 75 and 77 in response to the output of the detecting means for controlling the supply of the compressed air and the water. Therefore, switch 35 can be dispensed with, and the compressed air and the water can be supplied automatically when the electric arc 101 is generated by bringing the electrode bar 1 in the vicinity of the metal work 2. In this case, the supply of compressed air and water can be stopped automatically when the electric arc 101 is extinguished by withdrawing the electrode bar 1 from the metal work 2. Since a wide variety of modifications can be formed on the basis of the technical idea of the present invention as described in the foregoing, the scope of the present invention is clarified in the following claims.

We claim:

1. A metal working method for removing a portion of a metal work piece, comprising the steps of: generating an electric arc between an electrode bar and the metal work piece; heating and melting a portion of the metal work piece with the arc; discharging, during the step of heating and melting, a non-combustible gas in the form of a jet gas to the heated and molten portion of the metal work piece and the surrounding environment of the portion for blowing off the molten portion; mixing a non-combustible liquid in the non-combustible compressed gas; discharging the non-combustible liquid together with the non-combustible gas to form a jet spray; and supplying the jet spray to the molten portion of the metal work piece and the surrounding environment of the portion.

2. A metal working method in accordance with claim 1 in which said non-combustible compressed gas is compressed air and said non-combustible liquid is water.

3. A metal working method in accordance with claim 1 comprising adding a frother to said non-combustible liquid.

4. A metal working method in accordance with claim 1 comprising adding a reducing agent to said non-combustible liquid.

5. A metal working method in accordance with claim 1 comprising adding an antirust agent to said non-combustible liquid.

6. A metal working method in accordance with claim 1 comprising adding coloring agent to said non-combustible liquid.

7. A metal working method in accordance with claim 1 comprising adding a perfume to said non-combustible liquid.

8. A metal working apparatus for scraping off a portion of a metal work piece which comprises an electrode bar supporting means adapted to support an electrode bar with a suitable space kept between the electrode bar and a metal work piece, a power source means adapted to apply, through said supporting means, a voltage for generating an electric arc across said electrode bar and said metal work piece, a compressed air supply means adapted to flow compressed air through said supporting means for discharging the compressed air along said electrode bar to form an air jet so that said air jet strikes on a portion of said metal work piece which has been heated and made molten by said arc to blow off said heated and molten portion of said metal work piece, and a water supply means adapted to mix water in said compressed air for discharging the water together with said compressed air through said supporting means to form a jet spray.

9. A metal working apparatus comprising: an electrode bar supporting means for supporting an electrode bar with a suitable space kept between the electrode bar and a metal work piece; a power supply means for applying a voltage across the metal work piece and the electrode bar to generate an electric arc in the space to heat and make molten a portion of the metal work piece and the surrounding environment of the portion, a compressed gas supply means for providing a non-combustible compressed gas in the form of a jet gas to blow off the molten metal; a first passage through which the non-combustible compressed gas passes; liquid supply means for injecting a non-combustible liquid into said first passage through which the non-combustible compressed gas passes; and means for discharging the non-combustible liquid together with the non-combustible compressed gas to form a jet spray and for supplying the jet spray to the portion of the metal work piece heated and made molten and the surrounding environment of the portion.

10. A metal working apparatus in accordance with claim 9, wherein said compressed gas supply means further comprises a first valve mounted on a second fluid passage and controlling the supply of said compressed gas, said liquid supply means having a second valve mounted on a third liquid passage and controlling the supply of said liquid, and said first passage joining the outlets of said fluid passage and said liquid passage to each other for mixing said compressed gas and said liquid.

11. A metal working apparatus in accordance with claim 10 comprising a detecting means adapted to detect the generation of said arc, and a valve operating means for controlling, in response to the output of said detecting means, the control operations of said first and second valves.

12. A metal working apparatus in accordance with claim 10, wherein said liquid supply means further comprises an enclosed liquid tank disposed upstream of said liquid passage, and a compressing passage branching off between the outlet of said first valve and the inlet of said first passage jointed to both the fluid passage and the liquid passage, said compressing passage introducing said compressed gas into the upper part of said tank.

13. A metal working apparatus in accordance with claim 12, wherein the apparatus further comprises a supply tank connected to said liquid tank through a fourth supply passage and arranged at a location higher than said liquid tank, a check valve provided in said supply passage, said check valve being closed when the pressure in said liquid tank is higher than the pressure in said supply tank and opened when said pressure in said liquid tank is lower than the pressure in said supply tank, and another automatic liquid supply means for restoring a liquid level to a required position, by detecting the fact that the liquid level in said supply tank has been lowered.

14. A metal working apparatus in accordance with claim 13, wherein said first valve is a three-way valve having an air port in addition to two ports connected to an upstream portion of the fluid passage and a midstream portion of said fluid passage, said air port putting said midstream portion of the fluid passage in communication with atmospheric air only when the supply of compressed gas is stopped.

15. A metal working apparatus in accordance with claim 12, wherein the fluid resistance in the passage portion from said first valve through said compressing passage to said liquid tank is smaller than the fluid resistance in the passage portion from said first valve through said first passage to said means for discharging, and wherein said first and second valves perform the control operations, simultaneously, by a single operation of switch means.

16. A metal working apparatus in accordance with claim 15, wherein said electrode bar supporting means includes an electric conductive head for supporting the electrode bar and having jet holes, and a handle electrically insulated from said head, wherein said means for discharging includes a fifth passage for introducing a mixture of compressed gas and liquid to the jet holes located in said head, wherein said power supply means includes an electric current path for flowing electric current to said head, said means for discharging including a flexible cable having the fifth passage and the electric current path therein, the switch means being positioned on said handle and controlling the control operations of the first and second valves, and wherein said first and second valves include electromagnetic valves which are remote controlled simultaneously by said switch means.

* * * * *